United States Patent
Park

(10) Patent No.: US 12,541,979 B2
(45) Date of Patent: Feb. 3, 2026

(54) APPARATUS FOR PROCESSING IMAGE, VEHICLE HAVING THE SAME, AND CONTROL METHOD THEREOF

(71) Applicants: HYUNDAI MOTOR COMPANY, Seoul (KR); KIA CORPORATION, Seoul (KR)

(72) Inventor: Hyun Sung Park, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 362 days.

(21) Appl. No.: 18/129,485

(22) Filed: Mar. 31, 2023

(65) Prior Publication Data
US 2023/0351760 A1    Nov. 2, 2023

(30) Foreign Application Priority Data
Mar. 31, 2022    (KR) ................ 10-2022-0040605

(51) Int. Cl.
*G06V 20/56*    (2022.01)
*G06T 7/73*    (2017.01)
*G06V 10/77*    (2022.01)

(52) U.S. Cl.
CPC ........... *G06V 20/56* (2022.01); *G06T 7/73* (2017.01); *G06V 10/7715* (2022.01); *G06T 2207/30252* (2013.01)

(58) Field of Classification Search
CPC .... G06V 20/56; G06V 10/7715; G06V 10/82; G06V 10/764; G06V 40/168; G06T 7/73;
(Continued)

(56) References Cited

U.S. PATENT DOCUMENTS 9,881,234 B2    1/2018 Huang et al.
10,860,837 B2   12/2020 Ranjan et al.
(Continued)

FOREIGN PATENT DOCUMENTS

CN         112132839 A    12/2020
KR    10-2017-0134158 A  12/2017
(Continued)

OTHER PUBLICATIONS

Lan et al, HIH: Towards More Accurate Face Alignment via Heatmap in Heatmap, 2021, arXiv:2104.03100v1, pp. 1-12 (Year: 2021).*

(Continued)

*Primary Examiner* — Kathleen M Broughton
(74) *Attorney, Agent, or Firm* — Morgan, Lewis & Bockius LLP

(57) ABSTRACT

Provided is an apparatus for processing an image, a vehicle having the same, and a control method thereof, including: a receiver configured to receive an image; and a controller including at least one processor configured to process the image, wherein the controller is configured to input the image to a trained feature point heat map extraction model to output a feature point heat map for at least one object included in the image, based on the feature point heat map, identify a feature point heat map for a first object among objects included in the image through a non-maximum suppression (NMS) process, and based on the identified feature point heat map for the first object, extract a position of a feature point of the first object.

16 Claims, 10 Drawing Sheets

(58) Field of Classification Search
CPC . G06T 2207/30252; G06T 2207/30201; G06T 2207/30268; G06N 3/08
See application file for complete search history.

(56) References Cited

U.S. PATENT DOCUMENTS

| | | | |
|---|---|---|---|
| 2021/0264175 A1* | 8/2021 | Zhang | G08G 1/166 |
| 2021/0383549 A1* | 12/2021 | Wang | G06T 7/11 |
| 2023/0017135 A1* | 1/2023 | Zlotnick | G06N 3/045 |
| 2023/0101653 A1* | 3/2023 | Matsumura | G06V 40/10 |
| | | | 382/159 |

FOREIGN PATENT DOCUMENTS

| | | | |
|---|---|---|---|
| KR | 10-2036963 B1 | 11/2019 | |
| WO | WO-2021190664 A1 * | 9/2021 | G06F 18/214 |

OTHER PUBLICATIONS

Zhou et al, Bottom-up Object Detection by Grouping Extreme and Center Points, 2019, arXiv:1901.08043v3, pp. 1-10 (Year: 2019).*

Pachika et al, Feature Extraction and Heatmap Generation Approach Based on 3D Object Models and CNNs, 2022, Nature Int. Conference on Advances in Comp Eng and Comms Systems, pp. 1-13. (Year: 2022).*

Yu et al, Overlapped Human Pose Estimation using Non-Maximum Suppression based on Shape Similarity, 2021, China Automation Congress pp. 1-7. (Year: 2021).*

Hyundai Motor Group "Development of Driver Status Monitoring System using Deep Learning ," Sep. 2021.

"HMG Developer Conference," Nov. 2021.

* cited by examiner

- RELATED ART -

FIG. 10

| Method | NME (%) |
|---|---|
| Baseline | 7.02% |
| Baseline + NMS | 5.31% |

APPARATUS FOR PROCESSING IMAGE, VEHICLE HAVING THE SAME, AND CONTROL METHOD THEREOF

CROSS-REFERENCE TO RELATED APPLICATION

This application is based on and claims priority under 35 U.S.C. § 119 to Korean Patent Application No. 10-2022-0040615, filed on Mar. 31, 2022 in the Korean Intellectual Property Office, the disclosure of which is incorporated herein by reference.

BACKGROUND

1. Field

The disclosure relates to an apparatus for processing an image, a vehicle having the same, and a method of controlling the same, and more specifically, to an apparatus for processing an image capable of detecting facial feature points from a heat map of an entire image without using object detection, a vehicle having the same, and a control method thereof.

2. Description of the Related Art

A technology of recognizing an object from an image is being actively studied in various fields, such as image processing, pattern recognition, computer vision, and neural networks, and is used in many commercial and legal applications.

Such an object recognition technology used in various fields enables various objects included in a video or image (i.e., objects, such as a person, a vehicle, a dog, and the like), to be distinguished and recognized.

FIG. 1 is a conceptual diagram for describing a conventional technique for recognizing feature points of a face.

Referring to FIG. 1, the conventional technology uses a method of deriving feature points of a face by detecting coordinates of a face through a face extraction model X1, which is trained from an input image and/or a video, cutting a face region through the detected face coordinates, inputting the cut face region to a feature point extraction model X2 and detecting facial feature points only in the corresponding face region.

However, the conventional technique derives facial feature points according to the performance of the face extraction model X1, and thus is greatly affected by the performance of the face extraction model X1.

In addition, in relation to an autonomous driving technology of a vehicle to which the conventional technology is applied, faces except for the driver's face are not important when recognizing the face of the driver inside the vehicle, and thus a great amount of cost is taken for face recognition performance by a process of searching for small faces in an area other than the central area in an image and/or video.

In addition, in the conventional technology, in order to derive feature points of the face, an additional cost is taken for a process of detecting the coordinates of the face through a trained face extraction model X1 and cutting the face region through the detected face coordinates.

SUMMARY

The present disclosure may provide an apparatus for processing an image, a vehicle having the same, and a control method thereof that are capable of improving a speed of detecting feature points by omitting an object detection process and an object-specific processing.

The technical objectives of the disclosure are not limited to the above, and other objectives may become apparent to those of ordinary skill in the art based on the following descriptions.

According to an aspect of the disclosure, there is provided an apparatus for processing an image, the apparatus including: a receiver configured to receive an image; and a controller including at least one processor configured to process the image, wherein the controller is configured to: input the image to a trained feature point heat map extraction model to output a feature point heat map for at least one object included in the image; based on the feature point heat map, identify a feature point heat map for a first object among objects included in the image through a non-maximum suppression (NMS) process; and based on the identified feature point heat map for the first object, extract a position of a feature point of the first object.

The NMS process may be configured to: input the feature point heat map to an object heat map extraction model to output an object heat map for a central point of the at least one object included in the image; and based on the object heat map and the feature point heat map, identify a heat map for the first object.

The object heat map extraction model may be configured to output an object heat map that is generated with respect to a central point of at least one object included in the feature point heat map, so as to include feature points of the object based on a two dimensional (2D) Gaussian distribution.

The object heat map extraction model may be configured to output an object heat map that is generated based on a two dimensional (2D) Gaussian distribution so as to include the feature points of the object within a predetermined reliability.

The controller may be configured to: identify an object heat map for a first central point among at least one central point included in the object heat map; and based on the object heat map for the first central point and the feature point heat map, identify the feature point heat map for the first object.

The controller may be configured to, by using a value of the object heat map for the first central point as a weight, perform a multiplication on a value of the feature point heat map to identify the heat map for the first object.

The controller may be configured to: identify an object heat map for a second central point among at least one central point included in the object heat map; based on the object heat map for the second central point and the feature point heat map, identify a feature point heat map for a second object; and based on the identified feature point heat map for the second object, extract a position of a feature point of the second object.

The controller may be configured to, based on the extracted position of the feature point of the first object and the extracted position of the feature point of the second object, extract feature points of at least two objects included in the image.

The object heat map extraction model may be trained using the feature point heat map and a ground truth generated based on the feature point heat map.

The ground truth may be generated, when average coordinates of feature points for at least one object included in the feature point heat map are used as a central point of each of the at least one object such that a central point closer to a center of the feature point heat map has a higher heat value.

According to an aspect of the disclosure, there is provided an apparatus for processing an image, the apparatus including a controller including at least one processor for processing an image, wherein the controller is configured to: based on a feature point heat map generated from processing an image, identify a feature point heat map for a first object among objects included in the image through a non-maximum suppression (NMS) process; and based on the identified feature point heat map for the first object, extract a position of a feature point of the first object.

According to an aspect of the disclosure, there is provided a method of processing an image, the method including: receiving an image; inputting the image to a trained feature point heat map extraction model to output a feature point heat map for at least one object included in the image; based on the feature point heat map, identifying a feature point heat map for a first object among objects included in the image through a non-maximum suppression (NMS) process; and based on the identified feature point heat map for the first object, extracting a position of a feature point of the first object.

According to an aspect of the disclosure, there is provided a vehicle including: a receiver configured to receive an image; and a controller including at least one processor configured to process the image, wherein the controller is configured to: input the image to a trained feature point heat map extraction model to output a feature point heat map for at least one object included in the image; based on the feature point heat map, identify a feature point heat map for a first object among objects included in the image through a non-maximum suppression (NMS) process; and based on the identified feature point heat map for the first object, extract a position of a feature point of the first object.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a table for describing the performance comparison according to an NMS process in a method of processing an image according to an embodiment of the present application.

DETAILED DESCRIPTION

Figure 1:
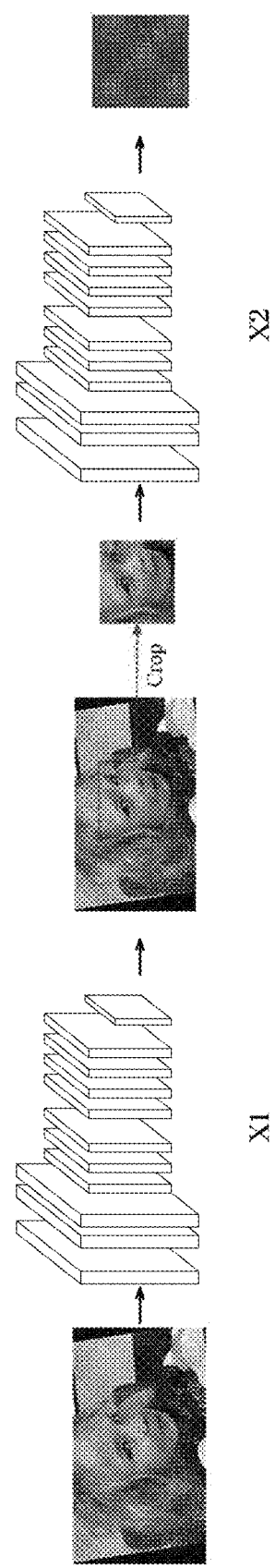
FIG. 1 is a conceptual diagram for describing a conventional technique for recognizing feature points of a face.

Like numerals refer to like elements throughout the specification. Not all elements of embodiments of the present disclosure will be described, and description of what are commonly known in the art or what overlap each other in the embodiments will be omitted. The terms such as "~ part", "~ module", "~member", "~block" or the like may be implemented in software or hardware, and according to embodiments, a plurality of "~ parts", a plurality of "~ modules", a plurality of "~members", a plurality of "~blocks" or the like may be implemented as one component, or may include a plurality of components.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, operations, operations, elements, and/or components, but do not preclude the presence or addition of one or more other features, integers, operations, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

A singular expression includes plural expression unless the context clearly dictates otherwise.

Reference numerals used for method operations are just used for convenience of explanation, but not to limit an order of the operations. Thus, unless the context clearly dictates otherwise, the written order may be practiced otherwise.

FIG. 1 is a conceptual diagram for describing a conventional technique for recognizing feature points of a face.

Referring to FIG. 1, the conventional technology uses a method of deriving feature points of a face by detecting coordinates of a face through a face extraction model X1 trained from an input image and/or a video, cutting a face region through the detected face coordinates, inputting the cut face region to a feature point extraction model X2, and detecting facial feature points only in the corresponding face region.

However, since the conventional technique derives facial feature points according to the performance of the face extraction model X1, and thus is greatly affected by the performance of the face extraction model X1.

In addition, in relation to an autonomous driving technology of a vehicle to which the conventional technology is applied, faces except for the driver's face are not important when recognizing the face of the driver inside the vehicle, thus a great amount of cost is taken for face recognition performance by a process of searching for small faces in an area other than the central area in an image and/or video.

In addition, in the conventional technology, in order to derive feature points of the face, an additional cost is taken for a process of detecting the coordinates of the face through a trained face extraction model X1 and cutting the face region through the detected face coordinates.

An apparatus for processing an image, a vehicle having the same, and a control method thereof according to an embodiment of the present disclosure may be provided to solve the above-described limitations. However, the disclosure is not limited thereto.

A vehicle 10 according to an embodiment of the disclosure refers to a transportation device that may travel on a road or track. Hereinafter, for the sake of convenience of description, the vehicle 10 will be illustrated based on a four-wheeled vehicle as an example. However, the embodiment of the vehicle 10 is not limited thereto.

The vehicle 10 may include a body including an exterior of the vehicle 10 and a frame of the vehicle 10 carrying people and/or cargo (for example, an engine room, a trunk, a bumper, a roof, a flank, a floor, etc.,) and a chassis including devices required for the vehicle 10 to travel, for example, an engine, a power transmission device, a steering device, a brake, and the like.

Meanwhile, general descriptions of the body and chassis of the vehicle 1 will be omitted.

Hereinafter, the operating principles and embodiments of the disclosure will be described with reference to the accompanying drawings.

Figure 2:
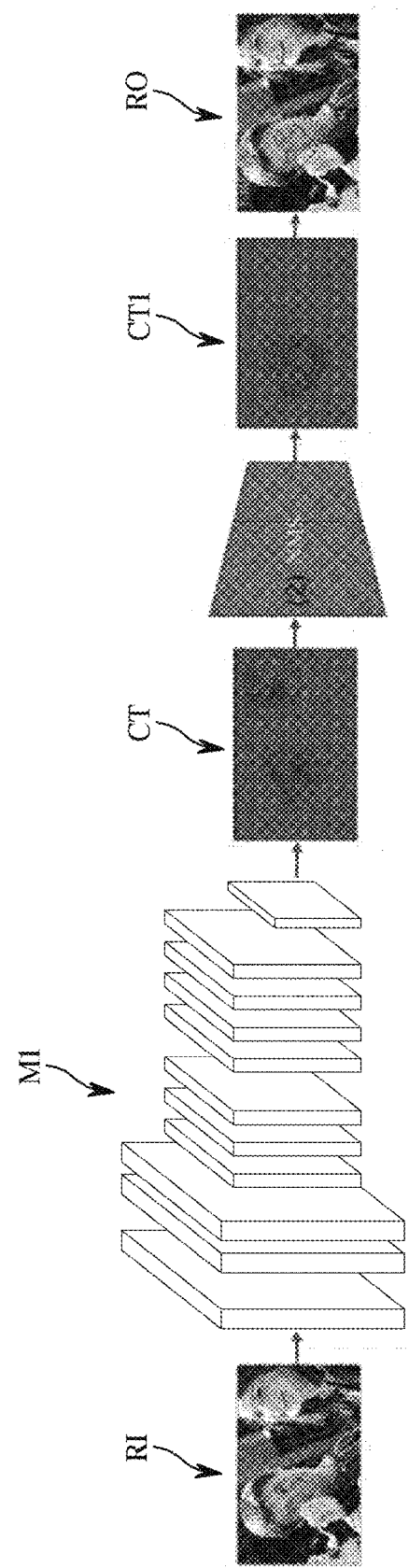
FIG. 2 is a conceptual diagram for describing a process of extracting an object feature point by an apparatus for processing an image according to an embodiment of the present application.

FIG. 2 is a conceptual diagram for describing a process of extracting an object feature point by an apparatus for processing an image according to an embodiment of the present application.

Referring to FIG. 2, the apparatus for processing an image receives an image RI, inputs the received image to a trained feature point heat map extraction model M1, to output a heat map CT for feature points of objects of the image RI.

In addition, the apparatus for processing an image may, based on the feature point heat map CT, identify a feature point heat map CT1 for a first object among objects included in the image RI through a non-maximum suppression (NMS) process, which will be described in detail below.

In addition, the apparatus for processing an image may, based on the identified feature point heat map CT1 for the first object, extract a position RO of a feature point of the first object.

Accordingly, the apparatus for processing an image may omit a process of inputting an image to a separate object extraction model (or a face extraction model) to recognize an object (or a face) included in the image, and cutting the image based on the recognized object (or the recognized face). Accordingly, the apparatus for processing an image may prevent the performance of extracting feature points of an object from being affected by the performance of the object extraction model (or the face extraction model).

Figure 3:
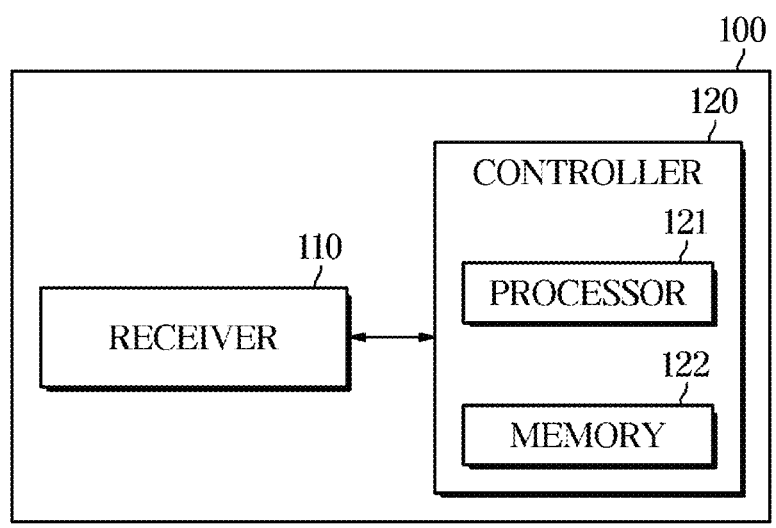
FIG. 3 is a block diagram illustrating a configuration of an apparatus for processing an image according to an embodiment of the present disclosure.

FIG. 3 is a block diagram illustrating a configuration of the apparatus 100 for processing an image according to an embodiment of the present disclosure.

Referring to FIG. 3, the apparatus 100 for processing an image may include a receiver 110 and a controller 120. More specifically, the controller 120 may include a processor 121 and a memory 122.

The receiver 110 may receive an image from an external server and/or an external device. For example, the receiver 110 may be configured to include a communication module to communicate with an external server. Here, the communication module may provide a 4G communication function, such as Long Term Evolution (LTE), as well as a 2G or 3G communication function. That is, the apparatus 100 for processing an image may communicate with a server connected to a mobile communication network through the communication module of the receiver 110.

The receiver 110 may transmit various types of data to the server, and may receive various types of data from the server. The communication module may be connected to an integrated antenna mounted on the vehicle 10, and may transmit/receive wireless signals to and from a mobile communication network through the integrated antenna. Data processed by the communication module may be transmitted to the processor 121 or transmitted to a mobile communication network connected through the integrated antenna. However, the disclosure is not limited thereto.

In another embodiment, the receiver 110 may include a universal serial bus (USB) port for a USB communication protocol. Accordingly, the receiver 110 may receive an image from the external server and/or the external device based on USB communication.

In another embodiment, the receiver 110 may include an image sensor. For example, the image sensor of the receiver 110 may be disposed to have a field of view facing the driver inside the vehicle 10.

The image sensor may include a plurality of photodiodes that convert light into an electrical signal, and the plurality of photodiodes may be arranged in a two-dimensional matrix. The image sensor may generate image information including a two-dimensional image, and may generate image information including a plurality of two-dimensional images arranged over time. Meanwhile, the following description will be made based on an image captured at a single time, but the disclosure may also apply based on the above-described image information.

Accordingly, the receiver 110 may acquire an image that is captured by the external server and/or the external device and/or may acquire an image taken directly.

The processor 121 may refer to a central processing unit (CPU), a graphics processing unit (GPU), or at least one dedicated processor for performing methods according to embodiments of the disclosure.

For example, the processor 121 may include a learning processor for machine learning and train a model composed of an artificial neural network using training data. Here, a trained artificial neural network may be referred to as a learning model. The learning model may be used to infer a result value with respect to new input data other than training data, and the inferred value may be used as a basis for determination to perform a certain operation.

The processor 121 may a processor in which a feature point heat map extraction map configured to input an image and output a feature point heat map for an object is stored, a processor configured to perform a non-maximum suppression (NMS) process based on the feature point heat map generated based on the feature point heat map extraction model, and a processor configured to, based on a feature point feature map for a single object among objects included in the image identified through the NMS process, extract a position of a feature point of the object. However, the disclosure is not limited thereto. That is, the number of processors is not limited thereto, and may be less or more than the number of processors described above.

The processor 121 may execute a program command stored in the memory 122 to be described below.

In addition, the processor 121 may change the command stored in the memory 122 to be described below. According to an embodiment, the processor 121 may update information in the memory 122 by machine learning. In other words, the processor 121 may change the command stored in the memory 122 by machine learning.

The memory 122 may include a volatile storage medium and/or a non-volatile storage medium. For example, the memory 122 may include a read only memory (ROM) and/or random access memory (RAM).

The memory 122 may store at least one command. More specifically, the memory 122 may store at least one command executed by the processor 121.

As described above, the memory 122 may include at least one command. According to the embodiment, the memory 122 may include a command to receive an image from the external server and/or the external device, a command to input the image into a trained feature point heat map extraction model to output a feature point heat map, a command to execute a NMS process based on the feature point heat map, a command to extract a position of a feature point of an object based on a feature point heat map, and the like. However, the disclosure is not limited thereto. Accordingly, it may be understood that the memory 122 may include a command related to an operation to be described below, and the processor 121 may execute a program related to the above-described operation and/or an operation to be described below.

The memory 122 may store at least one data calculated by the execution of the processor 121.

The apparatus 100 for processing an image according to the embodiment of the disclosure has been described above. Hereinafter, a method of processing an image according to an embodiment of the disclosure will be described in detail. The method of processing an image may be performed by the apparatus 100 for processing an image. Accordingly, it may be understood that operations described in the method of processing an image described below may be performed by the apparatus 100 for processing an image and/or the vehicle 10 having the same. Meanwhile, the description of the method of processing an image described below may be equally applied to the description of the apparatus 100 for processing an image and/or the vehicle 10 having the same.

A deep learning algorithm is one of machine learning algorithms and refers to a modeling technique developed from an artificial neural network (ANN) that mimics a human neural network. The ANN may be configured in a multi-layered hierarchical structure.

An ANN may be provided in a hierarchical structure including an input layer, an output layer, and at least one intermediate layer (or a hidden layer) (e.g., a kernel) between the input layer and the output layer. The deep learning algorithm may, based on such a multi-layer structure, perform learning to optimize the weight of an interlayer activation function, to derive reliable results.

The method of processing an image according to the embodiment of the present application may be a method of extracting a feature point of an object based on a shape and/or form of the object. Here, the object relates to an object included in the image, and may include, for example, a face of a human, and the like. However, the type of an object is not limited thereto.

A deep learning algorithm applicable to the apparatus for processing an image according to an embodiment of the present disclosure may include, for example, a convolutional neural network (CNN). However, the disclosure is not limited thereto. It may be understood that other deep learning algorithms may be applied to the disclosure according to embodiments.

Convolutional Neural Network (CNN) is characterized with a structure of extracting features of data and identifying a pattern of the features, unlike the existing technique in which a learning process is performed by extracting knowledge from data. The CNN may be performed through a convolution process and a pooling process. In other words, the CNN may include an algorithm in which a convolutional layer and a pooling layer are provided in combination. Here, in the convolution layer, a process (e.g., a convolution process) of extracting features of data is performed. The convolution process is a process of investigating neighboring components of each component in data to identify features, and deriving the identified features as a single sheet, and in such a compression process, the number of parameters may be effectively reduced. In the pooling layer, a process (e.g., a pooling process) for reducing the size of a layer that has passed through the convolution process is performed. The pooling process may reduce the size of data, cancel noise, and provide detailed parts with consistency. For example, CNN may be used in various fields, such as information extraction, sentence classification, face recognition, and the like. Meanwhile, CNN is a well-known technology, and detailed descriptions thereof will be omitted below.

Figure 4:
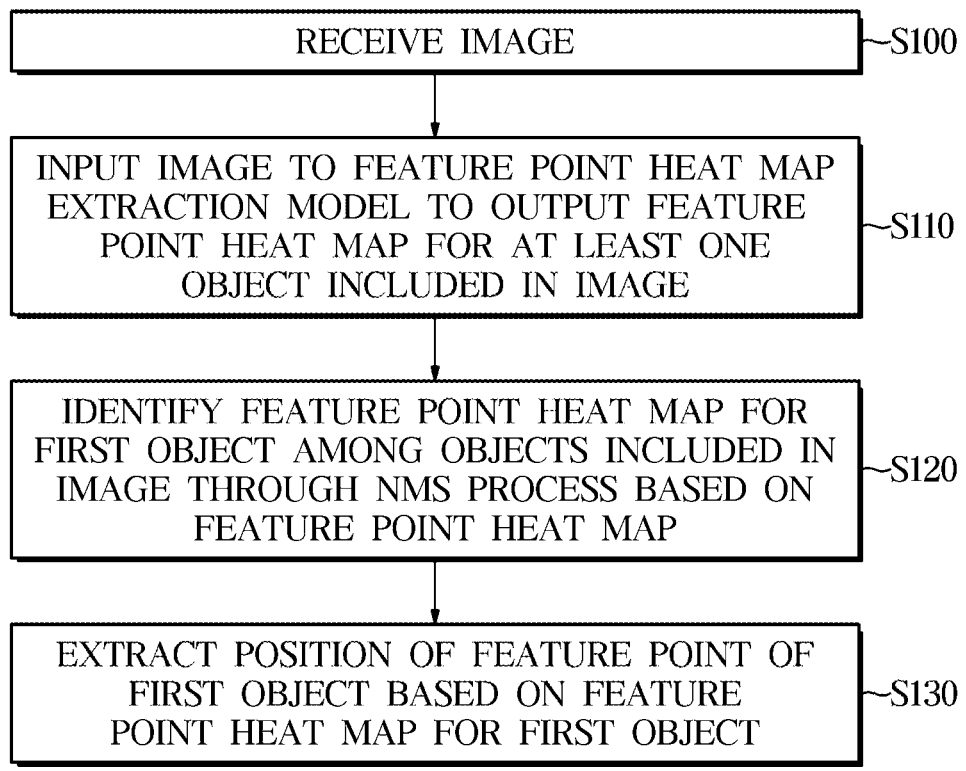
FIG. 4 is a flowchart showing a method of processing an image according to an embodiment of the present application.
Figure 5:
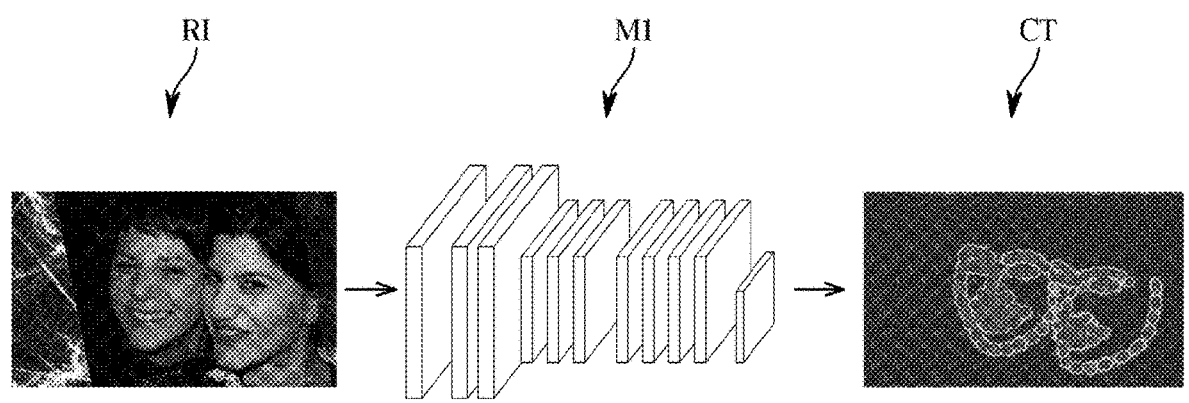
FIG. 5 is a conceptual diagram for describing a feature point heat map extraction model used in a method of processing an image according to an embodiment of the present application.

FIG. 4 is a flowchart showing a method of processing an image according to an embodiment of the present application. FIG. 5 is a conceptual diagram for describing a feature point heat map extraction model used in a method of processing an image according to an embodiment of the present application.

Referring to FIG. 4, the method of processing an image includes: receiving an image (S100), outputting a feature point heat map (S110), identifying a feature point heat map for a first object (S120), and extracting a position of a feature point of the first object (S130).

More specifically, the receiver 110 of the apparatus 100 for processing an image may receive (acquire) an image (S100).

In addition, the apparatus 100 for processing an image may input the image received (acquired) in operation S100 to a feature point heat map extraction model to output a feature point heat map for at least one object included in the image.

More specifically, referring to FIG. 5, the apparatus 100 for processing an image may input an image RI acquired by the receiver 110 to a feature point heat map extraction model M1 to output a feature point heat map CT.

Here, the feature point heat map extraction model M1 may be an artificial intelligence model trained to receive an image RI and output a feature point heat map CT of objects included in the image RI. More specifically, the feature point heat map extraction model M1 may be, for example, a model trained through a CNN algorithm.

The feature point heat map extraction model may be, for example, an AI model trained using an image and a heat map for feature points included in the image as a data set. In addition, in another embodiment, the feature point heat map extraction model may be a model trained using SIFT algorithm, HARRIS corner algorithm, SUSAN algorithm, etc. to extract feature points, such as corners, edges, contours, line intersections, etc., from an image. However, the disclosure is not limited thereto. Accordingly, it may be understood that a previously known feature point heat map extraction algorithm and/or a feature point heat map extraction algorithm to be developed in the future may be applied.

Meanwhile, the feature point heat map CT may be an output in a form (format) of a heat map, which is output based on an image being input to the feature point heat map extraction model M1 and represents feature points of an object included in the image. As shown in FIG. 5, the feature point heat map CT may be a representation in a heat map format that represents feature points of a person's face included in an image.

On the other hand, the feature point heat map extraction model M1, different from the conventional object feature point extraction model, omits a process of recognizing a separate object and cutting the object, so that feature points of all objects included in an image may be output as a heat map format. That is, the feature point heat map extraction model M1 may output feature points for all objects included in an input image in the form of a heat map. However, the feature point heat map extraction model M1 may be a model trained to output a heat map for a specific object rather than all objects.

That is, the feature point heat map extraction model M1 may be an AI model trained to output feature points for one type of object as a heat map format. For example, the feature point heat map extraction model M1 may be a model trained to output only feature points of a person's face in the form of a heat map.

Accordingly, the apparatus 100 for processing an image may input the image received (acquired) in operation S100 into the feature point heat map extraction model to output a feature point heat map CT for at least one object included in the image.

In addition, the apparatus 100 for processing an image may identify a feature point heat map CT1 for a first object among the at least one object included in the image through a non-maximum suppression (NMS) process, which will be described in detail below, based on the feature point heat map CT output in operation S110 (S120). That is, when the faces of two people are included in the image, the apparatus 100 for processing an image may output a feature point heat map for one of the two faces of the two people included in the image through a NMS process.

Thereafter, the apparatus 100 for processing an image may extract a position RO of a feature point of the first object based on the feature point heat map CT1 of the first object (S130). However, the disclosure is not limited thereto.

Hereinafter, a NMS process included in the method of processing an image performed by the apparatus 100 for processing an image will be described in detail with reference to FIGS. 6 to 9.

Figure 6:
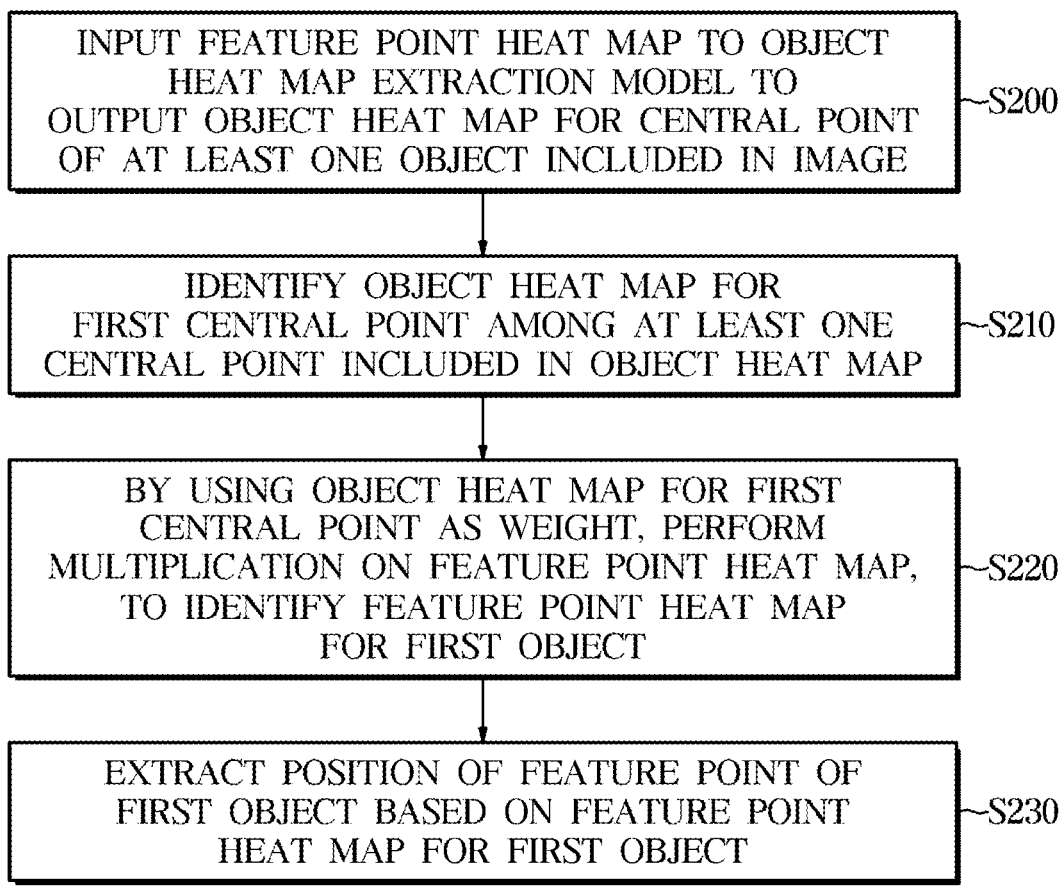
FIG. 6 is a flowchart showing a non-maximum suppression (NMS) process according to an embodiment of the present application.
Figure 7:
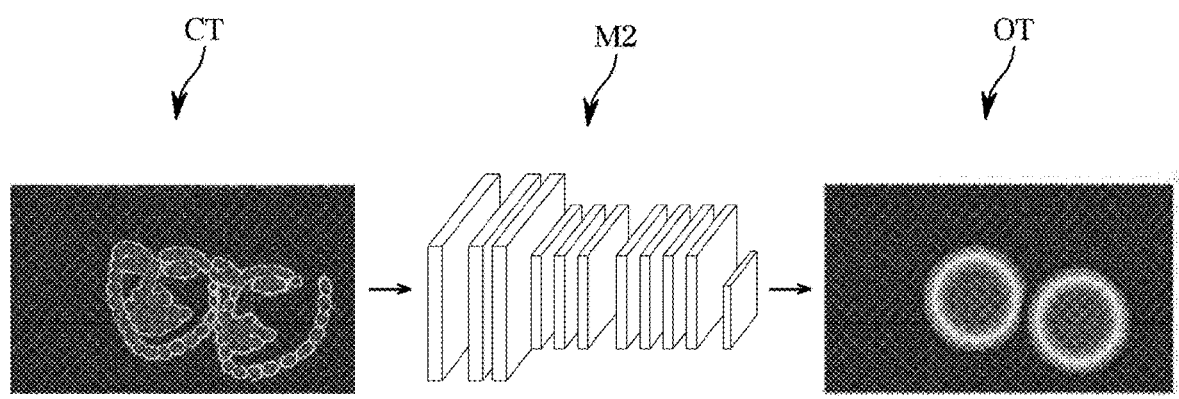
FIG. 7 is a conceptual diagram illustrating an object heat map extraction model used in a method of processing an image according to an embodiment of the present application.

FIG. 6 is a flowchart showing a non-maximum suppression (NMS) process according to an embodiment of the present application. FIG. 7 is a conceptual diagram illustrating an object heat map extraction model used in a method of processing an image according to an embodiment of the present application.

Referring to FIG. 6, the apparatus 100 for processing an image according to the embodiment of the present application inputs the feature point heat map output through operation S110 to an object heat map extraction model, to output an object heat map for a central point of at least one object included in the image (S200). In this case, the object heat map extraction model may be an AI model that is trained using a feature point heat map and an object heat map corresponding to the feature point heat map as training data.

In addition, the apparatus 100 for processing an image may identify an object heat map for a first central point among at least one central point included in the object heat map (S210).

In addition, the apparatus 100 for processing an image may, by using a value of the object heat map for the first central point as a weight, perform a multiplication on a value of the feature point heat map, to identify the feature point heat map for the first object (S220).

In addition, the apparatus 100 for processing an image may extract the position of the feature point of the first object based on the feature point heat map for the first object (S130).

On the other hand, the object heat map extraction model may be an AI model that is trained based on a feature point heat map and an object heat map, which is generated to set center coordinates (average coordinates) of feature points of an object included in the feature point heat map as a central point and have a circular shape expanded with respect to the central point so as to include the feature points of the object.

That is, the object heat map extraction model may be an AI model trained using a feature point heat map and a ground truth generated based on the feature point heat map using a data set. Here, the ground truth may refer to data including a description of a result value and/or correct answer of data to be learned.

Therefore, in this case, the ground truth may refer to an object heat map generated in the form of a circle that is extended from a central point, which corresponds to central coordinates (average coordinates) of feature points of an object included in the feature point heat map, so as to include the feature points of the object.

For example, when an image includes a single face of one person, a feature point heat map output by inputting the image to a feature point heat map extraction model may be a feature point heat map for a single object. In this case, a central point is derived based on the average value of coordinates of the feature point heat map, and an object heat map is generated so that a heat map in the form of a circle having the central point as the center thereof includes all the feature points for the single object, and the object heat map extraction model may be trained based on the object heat map and the feature point heat map.

On the other hand, the object heat map extraction model may be an AI model trained based on an object heat map, which is generated based on a 2D Gaussian distribution so as to include the feature points of the object with respect to the at least one central point included in the feature point heat map described above, and the feature point heat map. That is, in this case, the object heat map extraction model may be an AI model trained based on a feature point heat map and a ground truth, which includes an object heat map generated based on a 2D Gaussian distribution with respect to at least one central point included in the feature point heat map so as to include the feature points of the object.

For example, when the feature point heat map includes feature points for a first face and feature points for a second face, the object heat map extraction model may, with respect to a first central point, which is an average value (an average value of X and Y coordinates) of the feature points of the first face output an object heat map for the first central point based on a 2D Gaussian distribution so as to include the feature points for the first face within a predetermined reliability.

In addition, the object heat map extraction model may, with respect to a second central point, which is an average value (an average value of X and Y coordinates) of the feature points of the second face, output an object heat map for the second central point based on a 2D Gaussian distribution so as to include the feature points for the second face within a predetermined reliability.

In addition, the object heat map extraction model may be trained to output a higher value of the object heat map as a distance to the center of the image decreases. In this case, the ground truth for training the object heat map extraction model may refer to an object heat map generated, when average coordinates (central coordinates) of feature points of at least one object included in the feature point heat map are used as a central point, to have a higher heat value as a central point that is closer to the central area of the feature point heat map.

That is, the object heat map extraction model is a model trained to, when the first face is closer to the center of the image than the second face in the above example, assign the first central point with a higher value of the object heat map than that of the second central point. For example, the object heat map extraction model may be configured to, when an image include at least two objects, output an object heat map such that a central point of an object among the at least one object, which is closer to the center of the image, has a heat value of 100 and another central point of an object among the at least one object has a heat value of 99 which is one level lower than 100.

That is, the object heat map extracted by the object heat map extraction model is extracted such that a central point closer to the center is assigned a higher value, that is, the central points of a plurality of objects are assigned heat values that sequentially decrease in the order of the closet to the center. However, the disclosure is not limited thereto.

As another embodiment, the object heat map extraction model may be trained to output a higher value of the object heat map as a distance to a specific location of the image decreases. For example, the object heat map extraction model may be trained to output an object heat map having a higher heat value as being biased toward the right side of the image. This is because images acquired by the image sensor (e.g., the receiver) arranged to have a field of view toward the driver of the vehicle 10 generally include driver's face (object) information in the right side field of view of the image sensor. Accordingly, the controller 120 may preferentially output an object heat map for the driver's face so that the position of the feature point of the driver's face is more rapidly and efficiently extracted. Referring to FIG. 7, the apparatus 100 for processing an image according to an embodiment of the present disclosure may input the feature point heat map CT output through the above-described operation S110 to an object heat map extraction model M2, to output an object heat map OT for central points of at least one object included in the image (S200).

That is, as shown in FIG. 7, the object heat map extraction model M2 may, in response to two objects being included in the feature point heat map CT, output an object heat map OT for central points of the two objects.

In addition, the apparatus 100 for processing an image may identify an object heat map OT1 for a first central point among the at least one central point included in the object heat map OT (S110). More specifically, the apparatus 100 for processing an image may identify coordinates having the highest heat value in the object heat map OT. Accordingly, the apparatus 100 for processing an image may identify one of the object heat maps including the coordinates having the highest heat value as an object heat map for the first central point. However, the disclosure is not limited thereto.

In another embodiment, the apparatus 100 for processing an image may, when an object heat map OT including at least two objects is output, identify coordinates having the highest heat value in the object heat map OT. In this case, when the identified coordinates having the highest heat value are at a distance greater than a preset distance from the center of the image, the apparatus 100 for processing an image may identify coordinates having the highest heat value in the object heat map OT, except for the identified coordinates having the highest heat value.

That is, the apparatus 100 for processing an image may, when coordinates having the highest heat value of an object heat map OT are extremely distant from the center of the image, identify coordinates having the highest heat value except for the object of the coordinates, and identify one of object heat maps OT including the identified coordinates as an object heat map for the first central point. Such a configuration prevents the position of feature points of the face at an abnormal position from being extracted, thereby efficiently providing reliability for the feature point of the driver and the speed of data processing.

Figure 8:
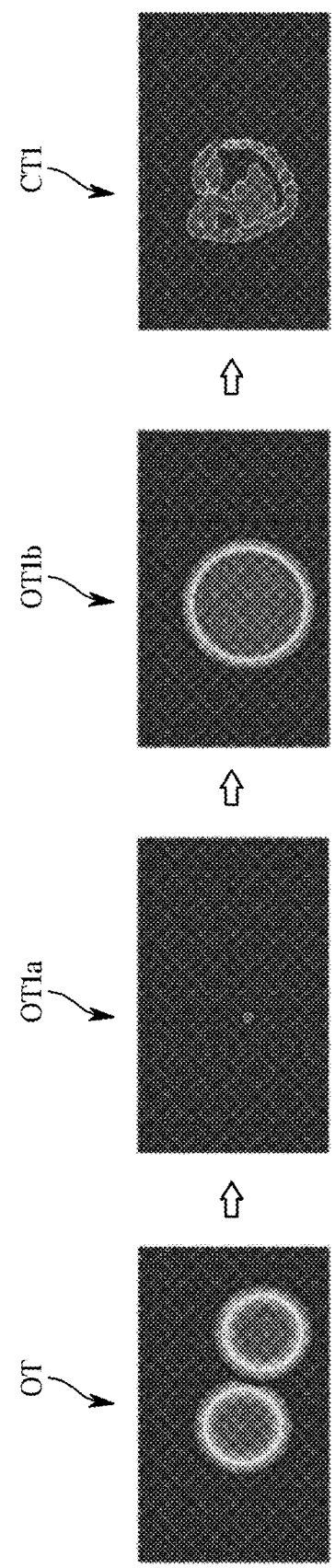
FIGS. 8 and 9 are conceptual diagrams illustrating a process in which the apparatus for processing an image according to an embodiment of the present application identifies a feature point heat map of each object.
Figure 9:
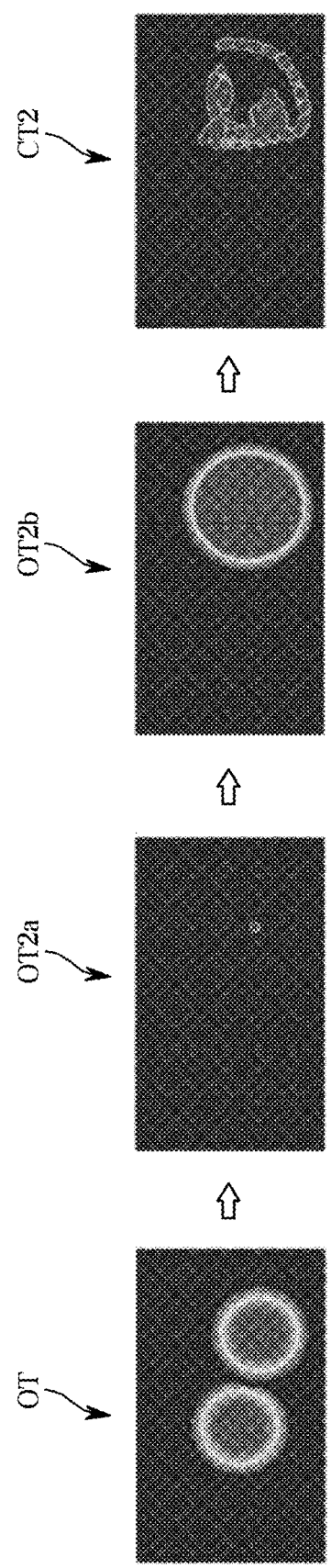

FIGS. 8 and 9 are conceptual diagrams illustrating a process in which the apparatus 100 for processing an image according to an embodiment of the present application identifies a feature point heat map of each object.

Referring to FIG. 8, the apparatus 100 for processing an image may identify coordinates OT1$a$ having the highest heat value in an object heat map OT. Accordingly, the apparatus 100 for processing an image may identify one of the object heat maps OT including the coordinates having the highest heat value as an object heat map OT1$b$ for the first central point.

In this case, the apparatus 100 for processing an image may identify a value of the object heat map OT1$b$ for the first central point as a weight. That is, the heat map is generated based on the heat values corresponding to each coordinates, and the apparatus 100 for processing an image may identify the values of the object heat map OT1$b$ for the first central point as a weight.

Accordingly, the apparatus 100 for processing an image may, based on the object heat map OT1$b$ for the first central point and the feature point heat map CT, identify a feature point heat map CT1 for the first object.

More specifically, as described above, since an object heat map is generated, with respect to at least one central point included in a feature point heat map, to include feature points of the object based on a 2D Gaussian distribution, the object heat map OT1$b$ for the first central point may include feature points for the first object with a predetermined reliability. Accordingly, feature points of a second object and/or points of other coordinates except for the feature points of the first object are assigned a heat value that is equal to or converges to 0, and the apparatus 100 for processing an image may, by using the value of the object heat map OT1$b$ for the first object as a weight, perform multiplication on the value of the feature point heat map CT, to thereby identify the feature point heat map CT1 for the first object.

That is, the apparatus 100 for processing an image may be configured to, based on a feature point heat map CT and an object heat map output based on the feature point heat map CT, output a feature point heat map CT1 for a first object among at least one object included in the feature point heat map CT.

Meanwhile, the apparatus 100 for processing an image may, in response to the feature point heat map CT1 for the first object being identified, output feature point heat maps for other objects except for the first object.

More specifically, referring to FIG. 9, the apparatus 100 for processing an image may identify coordinates having the highest heat value OT2$a$ in the object heat map OT in the object heat map OT except for the object heat map OT1$b$ for the first central point. That is, the apparatus 100 for processing an image may, in response to the feature point heat map CT1 for the first object being identified, identify the coordinates having the highest heat value OT2a in the object heat maps OT except for the object heat map OT1b for the first central point.

Accordingly, the apparatus 100 for processing an image may identify an object heat map OT2b for the second central point including the second central point in the object heat map OT. Then, the apparatus 100 for processing an image may identify a value of the object heat map OT2b for the second object as a weight and perform multiplication on the value of the object heat map OT2b for the second object and the value of the feature point heat map CT, to thereby output the feature point heat map CT2 for the second object.

As described above, the apparatus 100 for processing an image may output object heat maps for different objects in response to a plurality of objects being included in the image.

For example, the apparatus 100 for processing an image may, in response to a feature point heat map CT1 for a first object and a feature point heat map CT2 for a second object being identified, output feature point heat maps for other objects except for the first object and the second object.

More specifically, the apparatus 100 for processing an image may identify coordinates having the highest heat value in the object heat map OT except for the object heat map OT1b for the first central point and the object heat map OT2b for the second central point. That is, the apparatus 100 for processing an image may, in response to the feature point heat map CT1 for the first object and the feature point heat map CT2 for the second object being identified, identify coordinates having the highest heat value in the object heat map OT except for the object heat maps OT1b and OT2b for the first central point and the second central point.

Accordingly, the apparatus 100 for processing an image may identify an object heat map for a third central point, which includes the third central point, in the object heat map OT. Then, the apparatus 100 for processing an image may identify a value of the object heat map for the third object as a weight and perform multiplication on the value of the object heat map for the third object and the value of the feature point heat map CT, to output a feature point heat map for the third object.

The apparatus 100 for processing an image may, based on the feature point heat maps CT1, CT2 . . . and so on for the respective objects, extract feature points of at least two objects included in the input image. More specifically, the apparatus 100 for processing an image may, when only a first object is included in an image, identify a feature point heat map for the first object, extract the position of a feature point of the first object based on values of the feature point heat map for the first object.

That is, the apparatus 100 for processing an image may be implemented to extract points having a high heat value among heat values included in the feature point heat map for the first object as feature points. However, the disclosure is not limited thereto.

Meanwhile, in the case of the vehicle 10 including the apparatus 100 for processing an image, the vehicle 10 requires facial feature points of a single driver who drives the vehicle 10, so in this case, the apparatus 100 for processing an image may, in response to the feature point heat map CT1 for the first object being identified, extract the position of the feature point of the first object based on the feature point heat map CT1 for the first object without additionally identifying the feature point heat map of another object. Here, it may be understood that the first object may refer to the driver's face.

Figure 10:
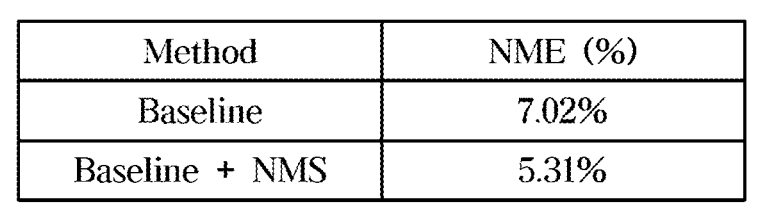

FIG. 10 is a table for describing the performance comparison according to a NMS process in a method of processing a method of processing an image according to an embodiment of the present application.

As a quantitative evaluation scale, the performance may be calculated based on a normalized mean error (NME). That is, NME may be calculated based on Equation 1 below.

$$NME = \frac{1}{N}\sum_{i=1}^{n}\frac{\|X - X^*\|_2}{d} \qquad \text{[Equation 1]}$$

Here, N denotes the number of feature points, X denotes predicted coordinates, X* denotes coordinates of Ground Truth, and d denotes an inter-ocular distance.

Referring to FIG. 10, it can be seen that the method of processing an image according to the embodiment of the present application has a lower NME value compared to a case in which a NMS process is included, according to whether the NMS process is included.

The apparatus 100 for processing an image, the vehicle 10 having the same, and the control method thereof according to an embodiment of the disclosure may omit a face detection process and a face-specific processing (preprocessing) so that the speed of facial feature point detection may be improved.

In addition, the apparatus 100 for processing an image, the vehicle 10 having the same, and the control method thereof may provide an apparatus and method of detecting facial features that are not affected by the performance of a face detection model.

In addition, the apparatus 100 for processing an image, the vehicle 10 having the same, and the control method thereof generate a feature point heat map from the entire image at once, thereby providing facial feature points more rapidly than the conventional method of generating a heat map for an individual face.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The program may include code coded in a computer language, such as C, C++, Java, another machine language, etc., that may be read by a processor (e.g., a central processing unit (CPU)) of a computer through a device interface of the computer in order for the computer to read the program and execute the methods implemented as the program. The code may include functional code that is related to a function that defines functions needed to execute the methods and may include execution procedure-related control code needed to cause the processor of the computer to execute the functions according to a predetermined procedure. In addition, the code may further include memory reference-related code indicating a position (an address) of an internal or external memory of the computer where additional information or media needed to cause the processor of the computer to execute the functions should be referenced. In addition, when the processor of the computer needs to communicate with any other computer or server, etc. at a remote site, to perform the above-described functions, the code may further include communication-related code such as how to communicate with any other computer or server at a remote site and what information or media should be transmitted or received during communication.

The operations of the method or algorithm described in connection with the embodiment of the present disclosure may be implemented directly in hardware, implemented in a software module executed by hardware, or implemented in a combination thereof. Software modules may reside in a RAM, a ROM, an Erasable Programmable ROM (EPROM), an Electrically Erasable Programmable ROM (EEPROM), a flash memory, a hard disk, a removable disk, a CD-ROM, or any other form of computer-readable recording medium known in the art to which the present disclosure pertains.

As is apparent from the above, the apparatus for processing an image, the vehicle having the same, and the control method thereof according to an embodiment can improve a speed of detecting feature points by omitting an object detection process and an object-specific processing.

The performance of outputting feature points of an object can be prevented from being affected by the performance of an object detection model.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. An apparatus for processing an image, the apparatus comprising:
   a receiver configured to receive an image; and
   a controller including at least one processor configured to process the image,
   wherein the controller is configured to
   input the image to a trained feature point heat map extraction model to output a feature point heat map for at least one object included in the image,
   based on the feature point heat map, determine a feature point heat map for a first object among objects included in the image through a non-maximum suppression (NMS) process, and
   based on the determined feature point heat map for the first object, extract a position of a feature point of the first object,
   wherein the NMS process is configured to input the feature point heat map to an object heat map extraction model to output an object heat map for a central point of the at least one object included in the image; and
   based on the object heat map and the feature point heat map, determine a heat map for the first object, and
   wherein the determining the feature point heat map for the first object includes:
   determining an object heat map for a first central point among at least one central point included in the object heat map; and
   based on the object heat map for the first central point and the feature point heat map, determining the feature point heat map for the first object.

2. The apparatus of claim 1, wherein the object heat map extraction model is configured to output the object heat map that is generated with respect to a central point of the at least one object included in the feature point heat map, so as to include feature points of the object based on a two dimensional (2D) Gaussian distribution.

3. The apparatus of claim 2, wherein the object heat map extraction model is configured to output the object heat map that is generated based on a two dimensional (2D) Gaussian distribution so as to include the feature points of the object within a predetermined reliability.

4. The apparatus of claim 3, wherein the object heat map extraction model is trained using the feature point heat map and a ground truth generated based on the feature point heat map.

5. The apparatus of claim 4, wherein the ground truth is generated, when average coordinates of feature points for at least one object included in the feature point heat map are used as a central point of each of the at least one object such that a central point closer to a center of the feature point heat map has a higher heat value.

6. The apparatus of claim 1, wherein the determining the feature point heat map for the first object includes:
   by using a value of the object heat map for the first central point as a weight, perform a multiplication on a value of the feature point heat map to identify the heat map for the first object.

7. The apparatus of claim 1, wherein the controller is configured to:
   identify an object heat map for a second central point among at least one central point included in the object heat map;
   based on the object heat map for the second central point and the feature point heat map, identify a feature point heat map for a second object; and
   based on the identified feature point heat map for the second object, extract a position of a feature point of the second object.

8. The apparatus of claim 7, wherein the controller is configured to, based on the extracted position of the feature point of the first object and the extracted position of the feature point of the second object, extract feature points of at least two objects included in the image.

9. An apparatus for processing an image, the apparatus including a controller including at least one processor for processing an image,
   wherein the controller is configured to:
   based on a feature point heat map generated from processing an image, determine a feature point heat map for a first object among objects included in the image through a non-maximum suppression (NMS) process; and
   based on the determined feature point heat map for the first object, extract a position of a feature point of the first object,
   wherein the NMS process is configured to input the feature point heat map to an object heat map extraction model to output an object heat map for a central point of the at least one object included in the image; and
   based on the object heat map and the feature point heat map, determine a heat map for the first object, and
   wherein the determining the feature point heat map for the first object includes determining an object heat map for a first central point among at least one central point included in the object heat map; and based on the object heat map for the first central point and the feature point heat map, determining the feature point heat map for the first object.

10. A method of processing an image, the method comprising:
    receiving an image;
    inputting the image to a trained feature point heat map extraction model to output a feature point heat map for at least one object included in the image;

based on the feature point heat map, determining a feature point heat map for a first object among objects included in the image through a non-maximum suppression (NMS) process; and based on the determined feature point heat map for the first object, extracting a position of a feature point of the first object, wherein the NMS process includes inputting the feature point heat map to an object heat map extraction model to output an object heat map for a central point of the at least one object included in the image; and based on the object heat map and the feature point heat map, determining a heat map for the first object, and wherein the determining of the feature point heat map for the first object includes determining an object heat map for a first central point among at least one central point included in the object heat map; and based on the object heat map for the first central point and the feature point heat map, determining the feature point heat map for the first object.

11. The method of claim 10, wherein the object heat map extraction model is configured to output an object heat map that is generated with respect to a central point of at least one object included in the feature point heat map, so as to include feature points of the object based on a two dimensional (2D) Gaussian distribution.

12. The method of claim 11, wherein the object heat map extraction model is configured to output an object heat map that is generated based on a two dimensional (2D) Gaussian distribution so as to include the feature points of the object within a predetermined reliability.

13. The method of claim 10, wherein the determining of the feature point heat map for the first object includes
by using a value of the object heat map for the first central point as a weight, performing a multiplication on a value of the feature point heat map to identify the heat map for the first object.

14. The method of claim 10, further comprising:
identifying an object heat map for a second central point among at least one central point included in the object heat map;
based on the object heat map for the second central point and the feature point heat map, identifying a feature point heat map for a second object, and
based on the identified feature point heat map for the second object, extracting a position of a feature point of the second object.

15. A non-transitory machine-readable recording medium on which a program for executing the method of processing an image of claim 10 is recorded.

16. A vehicle including the apparatus for processing an image of claim 1.

* * * * *